(12) United States Patent
Hormuth (10) Patent No.: US 8,843,772 B2
(45) Date of Patent: Sep. 23, 2014

(54) SYSTEMS AND METHODS FOR DYNAMIC POWER ALLOCATION IN AN INFORMATION HANDLING SYSTEM ENVIRONMENT

(75) Inventor: Robert W. Hormuth, Cedar Park, TX (US)

(73) Assignee: Dell Products LP, Round Rock, TX (US)

( * ) Notice: Subject to any disclaimer, the term of this patent is extended or adjusted under 35 U.S.C. 154(b) by 235 days.

(21) Appl. No.: 13/477,837

(22) Filed: May 22, 2012

(65) Prior Publication Data

US 2013/0318371 A1 Nov. 28, 2013

(51) Int. Cl.
*G06F 1/00* (2006.01)
*G06F 11/30* (2006.01)

(52) U.S. Cl.
USPC .......................................... 713/300; 713/340

(58) Field of Classification Search
CPC ............. G06F 1/26; G06F 1/18; G06F 1/189; Y02B 60/165
USPC ....................................................... 713/300
See application file for complete search history.

(56) References Cited

U.S. PATENT DOCUMENTS

| | | | |
|---|---|---|---|
| 5,532,945 A * | 7/1996 | Robinson ....................... | 713/321 |
| 6,233,625 B1 * | 5/2001 | Vander Kamp et al. ........ | 710/10 |
| 7,509,505 B2 * | 3/2009 | Randall et al. ................. | 713/300 |
| 7,539,881 B2 * | 5/2009 | Shaw et al. ..................... | 713/300 |
| 7,861,102 B1 | 12/2010 | Ranganathan et al. | |
| 7,895,455 B2 | 2/2011 | Green et al. | |
| 7,904,287 B2 | 3/2011 | Lefurgy et al. | |
| 7,979,729 B2 | 7/2011 | Bletsch et al. | |
| 8,006,108 B2 | 8/2011 | Brey et al. | |
| 2004/0255171 A1 * | 12/2004 | Zimmer et al. ............... | 713/300 |
| 2004/0255286 A1 * | 12/2004 | Rothman et al. .............. | 717/168 |
| 2006/0190532 A1 | 8/2006 | Chadalavada | |
| 2006/0212143 A1 | 9/2006 | Nguyen et al. | |
| 2006/0212726 A1 * | 9/2006 | Wang et al. .................... | 713/300 |
| 2007/0260896 A1 * | 11/2007 | Brundridge et al. .......... | 713/300 |
| 2008/0222435 A1 * | 9/2008 | Bolan et al. ................... | 713/310 |
| 2010/0281183 A1 * | 11/2010 | Van Bebber ...................... | 710/5 |
| 2012/0166825 A1 * | 6/2012 | Blackburn .................... | 713/310 |
| 2013/0226362 A1 * | 8/2013 | Jagadishprasad et al. .... | 700/297 |

OTHER PUBLICATIONS

Wikipedia, "Blade Server", Printed from Internet Feb. 24, 2012, 6 pgs.

* cited by examiner

*Primary Examiner* — Mark Connolly
(74) *Attorney, Agent, or Firm* — Egan, Peterman & Enders LLP.

(57) ABSTRACT

Systems and methods are disclosed that may be implemented to dynamically allocate relative power consumption between a group of multiple information handling system nodes that share a common (e.g., capacity-limited) power supply or source of power. The relative power consumption of the multiple information handling system nodes may be adjusted based on real time power consumption of each of the individual information handling system nodes, as well as the need for additional power by one or more of the individual information handling system nodes. A group of multiple information handling system nodes may dynamically communicate power usage characteristics in a distributed manner between themselves to implement a peer-to-peer acknowledgement architecture, or alternatively may communicate power usage characteristics to a centralized power manager.

23 Claims, 6 Drawing Sheets

SYSTEMS AND METHODS FOR DYNAMIC POWER ALLOCATION IN AN INFORMATION HANDLING SYSTEM ENVIRONMENT

FIELD OF THE INVENTION

This application relates to information handling systems, and more particularly to power allocation in an information handling system environment.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Multiple information handling systems, such as servers, may be grouped together for data center implementations. Power in the data center remains a major concern for information technology (IT) management. Performance per watt is a critical aspect to driving higher efficiency. Power capping is a recent concept that has been introduced for purposes of capping power of servers within a group of multiple servers in a rack. Using power capping, each server within a group of servers in a server rack is assigned a maximum capped power usage level that it cannot ever exceed, such that the total power consumption of all servers when operating at their maximum capped power levels does not exceed the total power capacity of the server rack. During operation of the server rack, a baseboard management controller (BMC) of each given server monitors real time power consumption of the given server and issues commands to the information handling unit of the given server to limit CPU, memory, storage, networking power consumption below the assigned power cap for the given server by adjusting operating conditions of the information handling unit of the given blade server. Conventional power capping is implemented in an attempt to reduce trapped power as compared to relying on IT overprovisioning of power in the data center, thus enabling greater density or number of servers.

SUMMARY OF THE INVENTION

Disclosed herein are systems and methods that may be implemented to dynamically allocate relative power consumption between a group of multiple information handling system nodes that share a common (e.g., capacity-limited) power supply or source of power. In one embodiment, the relative power consumption of the multiple information handling system nodes may be adjusted based on real time power consumption of each of the individual information handling system nodes, as well as the need for additional power by one or more of the individual information handling system nodes. For example, a group of multiple information handling system nodes may dynamically communicate power usage characteristics in a distributed manner between themselves to implement a peer-to-peer acknowledgement architecture, or alternatively may communicate power usage characteristics to a centralized power manager. In any case, power may be dynamically shared or otherwise allocated by adjustment between individual members of a group of multiple information handling system nodes based at least in part on the real time power usage or requirements of the individual information handling system nodes of the group and on the total amount of power of allocated (e.g., available or otherwise defined) for the group of information handling system nodes, such that the allocated amount of power for the group is not exceeded. The disclosed systems and methods may be implemented in one embodiment in a manner that ensures coherency for the used/available power of a group of multiple information handling system nodes.

For example, in one exemplary embodiment a group of information handling system nodes may be provided as a group of servers within a server rack or group of server racks that are each initially assigned an individual maximum power consumption level such that an allocated total maximum power consumption level for the group of servers is not exceeded by the total power consumption of the individual servers of the group when every one of the servers is each consuming its individual maximum power consumption level. Each of the given individual servers of the group may be configured with one or more processing devices that operate to dynamically communicate and share the real time power usage characteristics (e.g., current power usage or current power requirements) of the given server with the other servers of the group such that those servers that are not currently consuming or requiring their individual assigned maximum power consumption level may each release any unrequired excess power of their assigned maximum power consumption level (e.g., the difference between a given server's individual assigned maximum power consumption level and the given server's actual current power consumption level) for use by one or more of those servers of the group that currently require a current power consumption level that is more than their individual assigned maximum power consumption level.

In one exemplary embodiment, power credits and debits may be implemented in a manner that allows passing of power credits and debits between individual information handling system nodes (e.g., servers) of a group of information handling system nodes (e.g., rack of servers, group of server racks, group of servers in a data center, etc.) to enable dynamic redistribution of the power consumption levels of the individual information handling system nodes such that the total maximum power consumption level for the group of information handling system nodes is not exceeded by the total redistributed power consumption of the individual information handling system nodes of the group. In such an embodiment, each of the individual information handling system nodes of the group may be enabled to comprehend who is in their power credit/debit pool. One or more optional additional power profile characteristics may be established together with a policy for when to credit/debit power between the information handling system nodes such that the maximum power consumption level of a given information handling system node may be dynamically incremented (by borrowing power credits) and decremented (by loaning out power credits) in real time based on the current power needs of the given information handling system node and the current power needs of other information handling system nodes in the same group.

For example, in one possible embodiment, each individual information handling system node may be assigned a maximum incremented power consumption level that represents the upper limit to how much additional power credits an individual information handling system node may request to be released for its own consumption. Each individual information handling system node may also be assigned a minimum decremented power consumption level that represents the lower limit of current power consumption of a given information handling system node, below which the given information handling system node is not allowed to release power credits to other information handling system nodes of the same group. A maximum decremented power consumption time may be also be specified that represents the maximum period of time a given information handling system node may release power credits to one or more other information handling system nodes of the same group, and/or a maximum incremented power consumption time may be specified that represents the maximum period of time a given information handling system node may retain power credits obtained from one or more other information handling system nodes of the same group to allow the given information handling system node to consume a power level above its initially assigned individual maximum power consumption level. Use of maximum decremented power consumption time and/or maximum incremented power consumption time helps ensure that system coherency is maintained, e.g., to ensure that borrowed power credits are returned in the event that a given information handling system node crashes while possessing power credits borrowed from the power pool.

Other possible optional power profile characteristics include, but are not limited to, a minimum idle time that when exceeded signals a power-idle information handling system node to release power credits to other non-idle information handling system nodes of the same group. A given information handling system node may also be enabled in one embodiment to request any loaned power credits to be returned to it, e.g., upon a real time increase in the level of power needed by the information handling system node to accomplish its currently designated tasks.

The disclosed systems and methods may be implemented in a variety of different ways to allow pooling of power credits for a group of multiple information handling system nodes (e.g., servers), and to allow power to be debited in real time from the power pool by individual information handling system nodes and credited in real time to the power pool by individual information handing systems. Using a distributed embodiment of the disclosed systems and methods, each of the individual information handling system nodes in the group may be provided with the knowledge of which particular multiple information handling system nodes are included in the power pool, and may be configured to broadcast its power credits and power debits to the other members of the power pool. Each individual information handling system node may also be configured to adjust its current power consumption level based on its current power credits and debits, and to return to normal operation after adjusting its power consumption.

Using the disclosed systems and methods, power usage among a group of information handling system nodes may be managed in a manner that reduces or substantially eliminates trapped power, while at the same time allowing power capping to be employed for a power-constrained group of information handling system nodes, such as a server rack as well as any other group of information handling system nodes, e.g., multiple information handling system node nodes (such as multiple nodes in a chassis), blade servers, information handling system node racks that are logically grouped together, etc. For example, in one embodiment the disclosed systems and methods may be implemented to pool power among a group of information handling system node groups, such as two groups of information handling system node power groups made up of N and M numbers of information handling system node nodes, respectively. In such a case, when power group N has excess power trapped that is not being used, power group M may request to borrow that excess power assuming power-sharing policies are set up such that power group M may borrow power from another power group.

Advantageously, the disclosed systems and methods may be implemented in one embodiment to reduce or substantially eliminate the type of trapped power that is possible when using conventional power capping methodology to provision power for the number of servers in a rack. In this regard, trapped potential work occurs using conventional power capping methodology when a given amount of power is conventionally budgeted for each server of a rack of servers (i.e., as a maximum assigned power cap level for each server that is less than the maximum possible power consumption of each server), and when some of those servers are power constrained and using their full allotment of power while other servers of the group are not. In such a situation, the power constrained servers within the server group could otherwise produce more work but are limited due to their assigned conventional power cap. Thus, the number of servers that may be consuming their rated (e.g., label) power at any given time may be limited.

As an illustrative example, assume a rack of 20 servers, each with a power cap of 300 Watts, and 1 unit of work is produced for each watt. Conventional power capping would provision 6000 Watts of total power for the rack. During runtime, some servers could be power-constrained and consuming at the power capped level of 300 Watts while other servers could be idle and consuming, for example, 100 Watts. If ten of the servers are running at the capped power (300 W) and 10 of the servers are running idle (100 W) the rack is consuming 4000 Watts. This leaves 2000 Watts of unconsumed rack power and thus 2000 units of potential work trapped. However, using the disclosed systems and methods, one or more of those power-constrained servers running at the capped power limit may be enabled to utilize at least some of the 2000 Watts of unconsumed power to enable additional useful work to be performed by the server rack, thus freeing the trapped power allowing maximum potential work to be realized. Further, in one exemplary embodiment, the disclosed systems and methods may be implemented to provide the servers in the rack with the capability to communicate amongst themselves to dynamically reallocate power. In this way, power may be freed at the node level, and in a peer to peer manner, so as to minimize latency and/or to simplify any communications issues that may otherwise exist. However, in another embodiment, a centralized management entity may be implemented by one or more processors to manage power among individual servers of a rack or multiple groups of racks.

In one respect, disclosed herein is a system including: a group of multiple information handling system nodes; one or more common sources of power coupled to provide power to each node of the group of information handling system nodes;

and at least one processing device coupled to each of the group of multiple information handling system nodes. The system may be configured to: limit the power provided to each node of the group of information handling system nodes by an assigned power cap for that information handling system node, the total of all the assigned power caps of the group of information handling system nodes being equal to a total group power limit such that the total power provided to all of the information handling system nodes at any given time never exceeds the total group power limit; monitor in real time the power consumption amount of each of the information handling system nodes; and allocate power between the individual nodes of the group of information handling system nodes based on the real time monitored power consumption such that the total power provided to all of the information handling system nodes never exceeds the group power limit by temporarily decreasing by a given amount the assigned power cap of at least one of the information handling system nodes that has been consuming a lower real time monitored power amount than its assigned power cap, and by temporarily increasing by at least a portion of the decreased given amount the assigned power cap of at least one other one of the information handling system nodes that has been consuming a real time monitored power amount that is equal to its assigned power cap such that the total of the assigned power caps for all of the information handling system nodes never exceeds the assigned total group power limit.

In another respect, disclosed herein is a method of dynamically allocating relative power consumption between a group of multiple information handling system nodes, including: providing power to each node of the group of information handling system nodes, the power provided to each information handling system node being limited by an assigned power cap for that information handling system node, the total of all the assigned power caps being equal to a total group power limit such that the total power provided to all of the information handling system nodes at any given time never exceeds the total group power limit; monitoring in real time the power consumption amount of each of the information handling system nodes; and allocating power between the individual nodes of the group of information handling system nodes based on the real time monitored power consumption such that the total power provided to all of the information handling system nodes never exceeds the group power limit by temporarily decreasing by a given amount the assigned power cap of at least one of the information handling system nodes that has been consuming a lower real time monitored power amount than its assigned power cap, and by temporarily increasing by at least a portion of the decreased given amount the assigned power cap of at least one other one of the information handling system nodes that has been consuming a real time monitored power amount that is equal to its assigned power cap such that the total of the assigned power caps for all of the information handling system nodes never exceeds the assigned total group power limit.

DESCRIPTION OF ILLUSTRATIVE EMBODIMENTS

Figure 1:
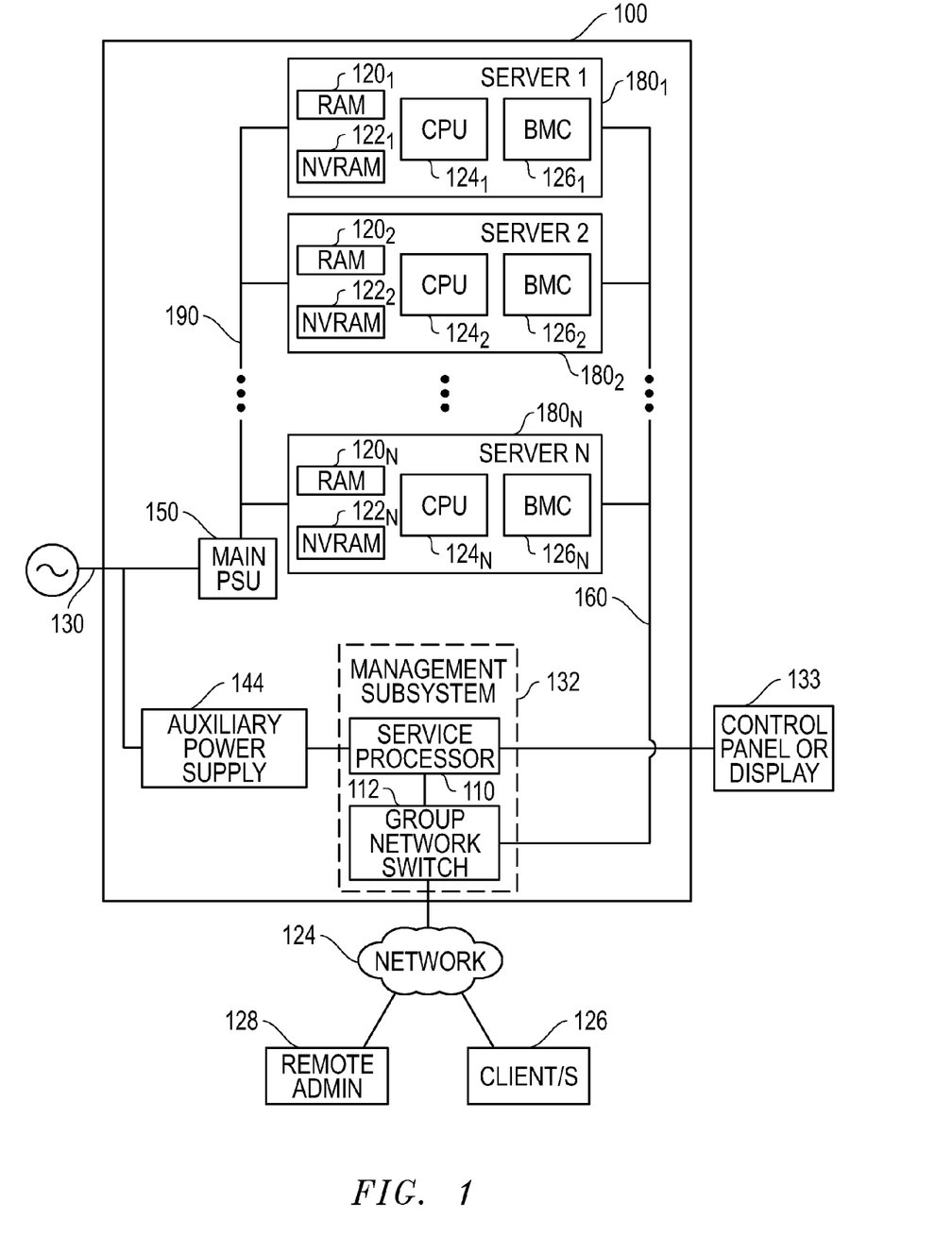
FIG. 1 is a simplified block diagram illustrating one exemplary embodiment of an information handling system group according to one exemplary embodiment of the disclosed systems and methods.

FIG. 1 is a block diagram illustrating one exemplary embodiment of an information handling system group configured in the form of a server rack system 100 having a plurality of information handling system nodes configured in the form of blade servers $180_1$ to $180_n$. As shown, each of blade servers $180_1$ to $180_n$ includes at least one respective central processing unit (CPU) 124 executing an in-band (e.g., host) operating system (OS) and at least one respective baseboard management controller (BMC) 126 executing out-of-band programming and coupled to the corresponding CPU 124 of the same blade server 180. Each of blade servers $180_1$ to $180_n$ also includes random access memory (RAM) 120 and non-volatile random access memory (NVRAM) 122 that may be present for purposes of saving and/or retrieving information used by the corresponding CPU 124 and/or BMC 126 of the same blade server 180. Besides BMC 126, it will be understood that any other suitable out-of-band processing device (e.g., service processor, embedded processor, etc.) may be employed to perform out-of-band operations using one or more out-of-band processing devices that are separate and independent from any in-band host central processing unit (CPU) that runs the host OS of the information handling system, and without management of any application executing with a host OS on the host CPU.

It will be understood that the particular illustrated components of each blade server 180 are exemplary only, and that additional, fewer, and/or alternative components may be present, e.g., each server blade 180 may include multiple CPUs, etc. It will also be understood that the information handling system group of FIG. 1 is exemplary only, and that other types of groups of information handling system nodes, and architectures thereof, may be employed in the practice of the disclosed systems and methods. For example, each given rack server system (which itself includes multiple blade server nodes) of a group of multiple rack server systems (that each includes multiple blade server nodes) may itself be treated as one information handling system node of the group of multiple rack server systems, e.g., in a situation where this group of multiple rack server systems share a common power constrained power supply, such as a common circuit breaker of a data center. In such an alternative embodiment, the disclosed systems and methods may be implemented to allocate power in real time between the multiple server rack system nodes of the group.

Together, components 124, 126, 120 and 122 of each given blade server 180 of FIG. 1 represents a system load of that given blade server that requires electric power to operate, it being understood that a system load of an information handling system may include fewer, additional and/or alternative electrical power-consuming components in other embodiments. As described further herein, at least one power-consuming component of a given information handling system node may be configured with a variable power-consumption capability, such that the overall power requirements for the given information handling system node may be controlled in real time, e.g., by control signal or other type of command. For example, power consumption of CPU 124 of blade server 180 may be varied using control signals provided by BMC 126.

In the illustrated embodiment of FIG. 1, server rack system 100 also includes a main power supply unit (PSU) 150 that receives AC power 130, performs AC/DC power conversion, and provides DC power to the system load of each blade server 180 by main power supply rail 190. In this embodiment, the power supply capacity of main PSU 150 is less than the total combined maximum power consumption capability of the system loads of blade servers $180_1$ to $180_n$.

It will be understood that in an alternative embodiment, one or more of individual blade server nodes $180_1$ to $180_n$ may be provided with its own power supply, either in addition to main PSU 150 or as an alternative to a main PSU 150. Moreover, each of the separate power supplies of the individual blade server nodes $180_1$ to $180_n$ may be configured to share power with other of the multiple blade server nodes $180_1$ to $180_n$ in a manner that allows pooling of power in a manner as described further herein. In such an alternative embodiment, the separate power supply of one or more of the multiple blade server nodes $180_1$ to $180_n$ may have a power supply capacity that is less than the maximum power consumption capability of the system load of its corresponding blade server node 180, and/or the total combined or pooled maximum power supply capacity of all of the multiple power supplies may be less than the total combined maximum power consumption capability of the system loads of the corresponding blade servers $180_1$ to $180_n$. Thus, the disclosed systems and methods may be implemented with systems having a single (i.e., common) power PSU for multiple nodes, or with systems having multiple PSUs that are capable of sharing power between nodes.

The amount of operating power required by the components of this system load of each blade server 180 may vary over time depending, for example, on the current processing load handled by the CPU 124, and the frequency of reads and writes to RAM 120 and NVRAM 122 as required by clients of the server 180. Each of blade servers 180 may be assigned a maximum rated operating power (label rated power) by the server manufacturer or supplier. This maximum rated operating power level represents the expected worst-case highest power consumption of the components of the server blade 180. Instantaneous operating power consumed by each given one of blade servers 180 may be controlled, for example, by adjusting operating frequency of the CPU (plus other elements, limiting DRAM BW, network link speed and bandwidth, putting hard drives in sleep states) 124 (and therefore voltage and power consumption) of the given blade server. Commands to control power consumption may be transmitted, for example, from the corresponding BMC 126 to the CPU 124 of the given blade server 180 in response to policies described further herein.

Main PSU 150 has a maximum rated output power that corresponds to the maximum power level capacity that PSU 150 is designed to provide. To ensure that the maximum power level capacity of PSU 150 is not exceeded, each of blade servers 180 may be assigned an individual maximum capped power consumption level such that the maximum rated output power of main PSU 150 is not exceeded by the total power consumption of the individual servers 180 of the group when every one of the servers 180 is each consuming its individual maximum capped power consumption level.

As further shown in FIG. 1, server rack system 100 may include a management subsystem 132 that includes an embedded service management processor 110 (e.g., such as a BMC microcontroller or any other suitable type of processing device) together with a network switch 112 that interfaces with external entities across network 124, e.g., Internet, corporate intranet, etc. As shown, an auxiliary power source 144 may be provided to run independently of the main PSU 150 and to convert AC power 130 and provide auxiliary DC power (Vaux) to management subsystem 132 and service processor 110. As shown, the BMC 126 of each blade server 180 is configured to communicate with external entities via network 124 across network connection 160 and network switch 112.

As shown, management subsystem 132 may be coupled via network 124 to remote administrator/s 128 and/or one or more clients 126 (e.g., other information handling systems) and/or to an optional local control panel and/or display 133 for displaying information and for local administrator interface to server rack system 100. In one embodiment, management subsystem 132 may provide local and/or remote control, reproduction and display of server operating parameters, for example, by out of band methods such as Web graphical user interface (GUI) using an integrated Dell Remote Access Controller (iDRAC) available from Dell Products L.P. of Round Rock, Tex. and/or textually via Intelligent Platform Management Interface (IPMI), Dell Remote Access Controller (RA-CADM) or WS Management (WS-MAN). Further information on remote access controllers may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

Figure 2:
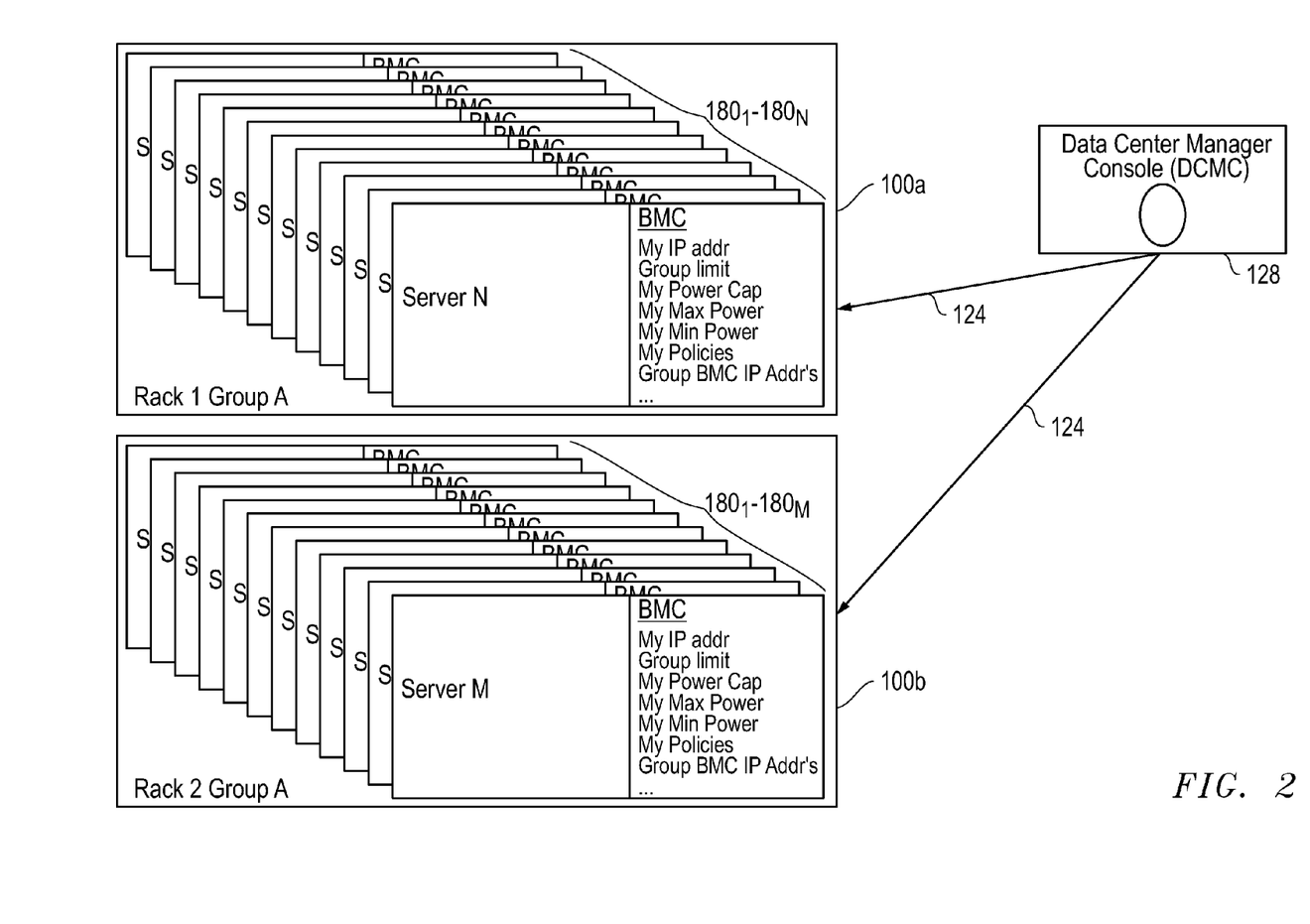
FIG. 2 illustrates configuration of multiple server rack systems according to one exemplary embodiment of the disclosed systems and methods.

FIG. 2 illustrates one exemplary embodiment for configuring multiple server rack systems 100a and 100b by remote administrator 128 in the form a data center manager console (DCMC) that in this embodiment acts as a power manager for server rack systems 100a and 100b. In this embodiment, DCMC 128 may be a dedicated power IT power console, e.g., running on a server or desktop computer that communicates across network 124. Besides the illustrated embodiment, it will be understood that similar methodology and architecture may also be employed for configuring a single server rack system 100 or more than two server rack systems 100, with each server rack system 100 including one or more blade server nodes. In the embodiment of FIG. 2, server rack systems 100a and 100b are first provided and configured as individual rack systems, e.g., by IT personnel. Next, remote administrator 128 begins by defining groups of information handling system nodes that are pooled together in a common credit/debit power pool, in this a first group is defined to include blade servers $180_1$ to $180_N$ of server rack system $100_a$, and a second group is defined to include blade servers $180_1$ to $180_M$ of server rack system $100_b$.

The remote administrator 128 of FIG. 2 also may be employed to set various power allocation information characteristics for each of the defined groups. Examples of such power allocation information characteristics include, but are not limited to, total group (e.g., rack) level power limit, individual node (e.g., server) power caps, individual node (e.g., server) maximum power levels, individual node (e.g., server) minimum power levels, individual node (e.g., server) time limit policies governing when to credit and debit power, priority for power allocation, etc. In this regard, values of individual characteristics (e.g., priority policies, power caps, maximum power levels, minimum power levels, time limit policies, etc.) may optionally vary between the different nodes of a common power pool group. For example, where a common rack server system 100 includes both web server nodes and data server nodes, a higher priority for obtaining available power credits from the power pool may be assigned to the data servers so that any available power credits will first be preferentially assigned to any power-requesting data servers before begin assigned to a requesting web server. It will be understood that the illustrated embodiment is exemplary only, and that any other technique and/or architecture suitable for defining and configuring nodes of power groups may be employed. For example, in one alternative embodiment, each of blade servers 180 of a server rack system 100$_a$ and/or 100$_b$ may be self-configured by management subsystem 132 (e.g., via iDRAC) of FIG. 1 rather than by remote administrator 128.

In one exemplary embodiment, during boot time, blade server nodes 180$_1$ to 180$_M$ of a server rack system 100 may characterize themselves based on deployed configuration by running a characterization profile routine during the BIOS initialization stage, e.g., each server node 180 may use power management bus (PMbus) supplies and smart voltage regulator/s (VRs) to monitor and characterize itself. Information technology (IT) management or other user/s may then define or otherwise provide a priority to each server node 180 based on the workload that the given server node 180 will be running, for example, an Exchange server may be assigned a high priority than a Print server. Internode communications and algorithms may then be used to self-adjust the server nodes 180 of a given rack 100 to ensure the highest level priority servers 180 receive a higher percentage of the overall rack level power.

Still referring to FIG. 2, the BMC 126 of each respective given blade server 180 acts in this embodiment to receive group definition and other power allocation information from remote administrator 128 or by any other suitable technique. In any case, the IP addresses of the other servers 180 in the same defined power pool group are communicated to the BMC 126 of each server 180 in the same group, and it is these IP addresses with which each server 180 in the group will share (e.g., loan and borrow) power credits. Each BMC 126 of each server node 180 may retain (e.g., in memory) the IP address information provided to it (e.g., both IP address of the BMC 126 of the individual server node 180 as well as the IP addresses of the BMCs of each of the other server nodes of the same defined group). Each BMC 126 may also retain other power allocation information characteristics such as group (e.g., rack) power limit, individual server node initial power cap, individual server node maximum power consumption limit, individual server node minimum power consumption limit, one or more policies for the individual server node 180 (e.g., time limit policies, priority policies, etc.), etc. In one embodiment, each BMC 126 of each individual server 180 may also maintain real time power usage statistics for the individual server 180, e.g., such as server power used counter, server power available counter, etc. Alternatively, at least one server 180 may be configured to act as a centralized gateway that performs the task/s of a rack level gateway. In such an exemplary embodiment, a server node 180 designated as a rack level gateway may be configured to provide the coordination point for an entire rack 100 as an option. Acting as a traffic cop or arbitrary, all other server nodes 180 in the rack 100 may alternately report their power statistics to the gateway, and may request power from the gateway versus using a peer-peer to method as described elsewhere herein.

Figure 3:
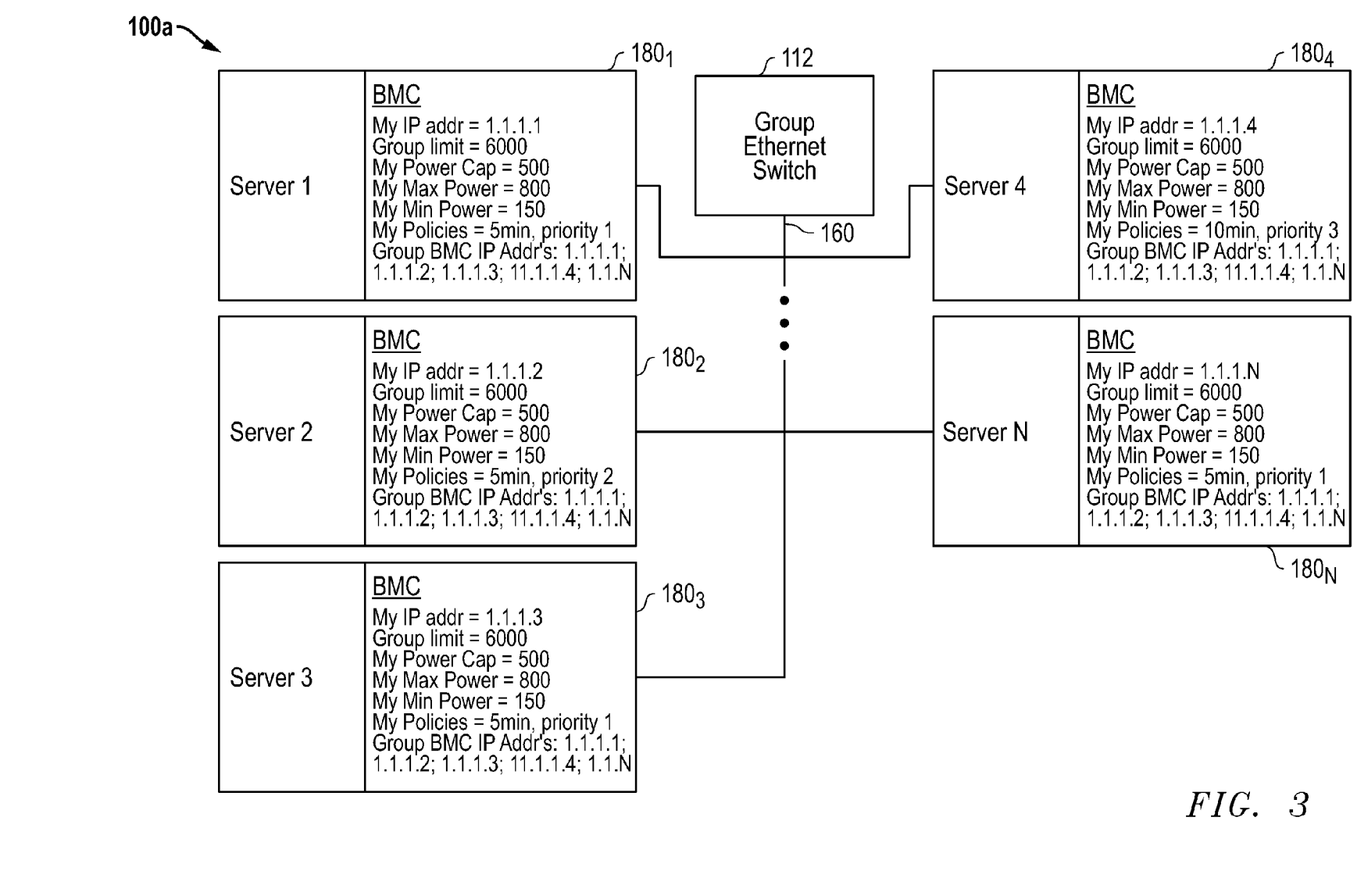
FIG. 3 illustrates a server rack system according to one exemplary embodiment of the disclosed systems and methods.

FIG. 3 illustrates one embodiment of server rack system 100$a$ of FIG. 2 as it may exist once configured with power allocation information to allow real time self-management and sharing of power credits and debits in a peer-to-peer fashion among the defined power group that includes server nodes 180$_1$-180$_N$. In this regard, server nodes 180$_1$-180$_N$ may now communicate amongst themselves to dynamically release power credits and claim power debits within the defined power group of rack system 100$a$, e.g., the BMC 126 of each respective individual server node 180 may release power credits to the BMCs 126 of other server nodes 180 of the same power group, and may claim power debits from the BMCs 126 of other server nodes 180 in the same power group in real time and as needed. As shown in FIG. 3, server nodes 180$_1$, 180$_3$ and 180$_N$ have been assigned highest priority (of 1) for power allocation, server node 180$_2$ has been assigned an intermediate priority (of 2) for power allocation, and server node 180$_4$ has been assigned lowest priority (of 3) for power allocation. Thus, any available power credits from the power pool will be first used to address the power needs of the highest priority servers 180$_1$, 180$_3$ and 180$_N$, then any remaining power credits will next be used to address the power needs of the intermediate priority server 180$_2$, and thereafter any remaining power credits that may be left will be used to address the power needs of the lowest priority server 180$_4$.

Figure 4:
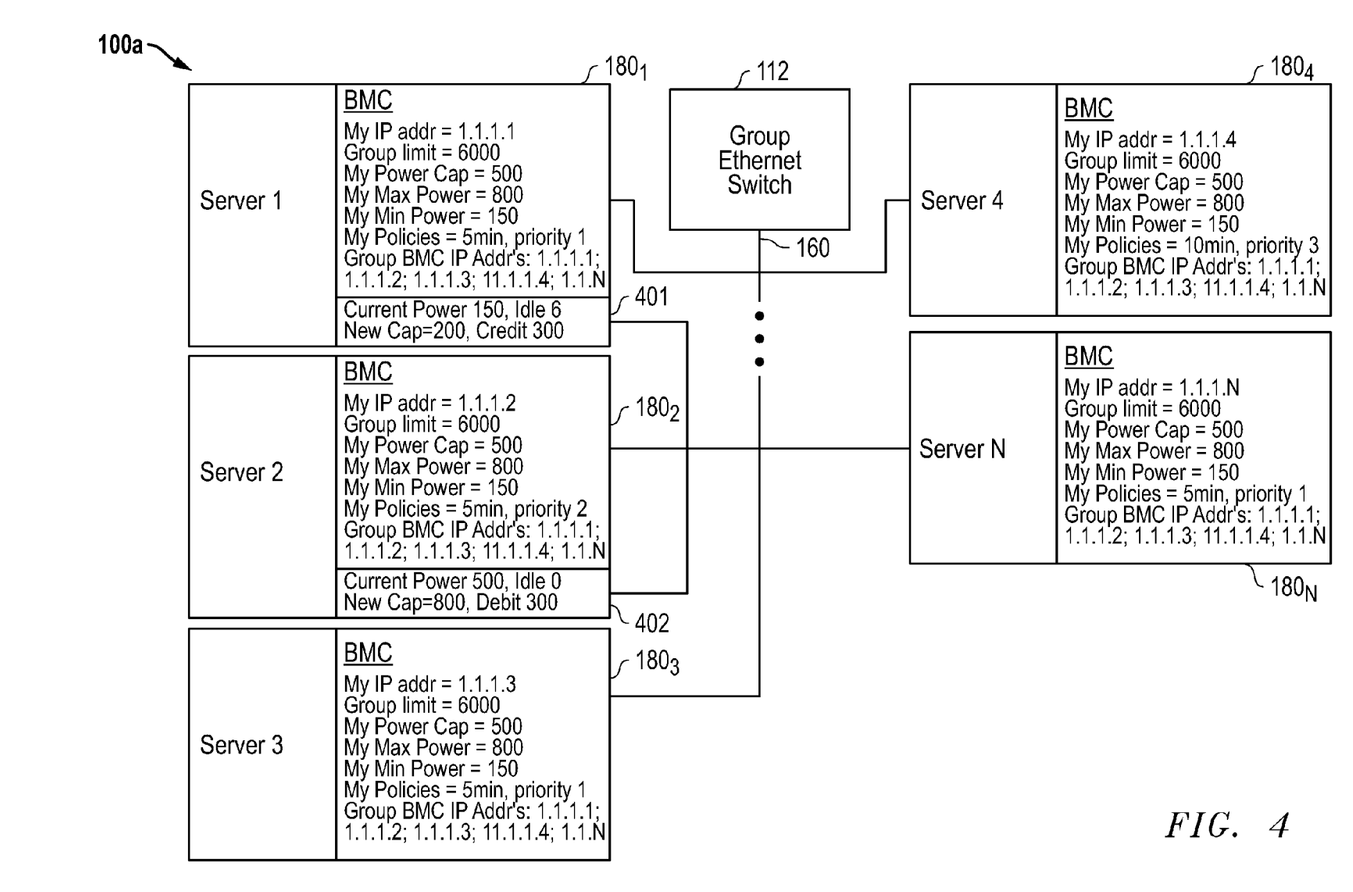
FIG. 4 illustrates a server rack system according to one exemplary embodiment of the disclosed systems and methods.

FIG. 4 illustrates an example condition under which server rack system 100$a$ of FIG. 2 may operate to dynamically allocate relative power consumption in real time between the multiple information handling system nodes 180$_1$-180$_N$. In this example of FIG. 4, server node 180$_1$ is shown as being idle (consuming a current power level of 150 Watts which is below its capped power level of 500 Watts) for an idle time of 6 minutes. When BMC 126 of server node 180$_1$ detects that server node 180$_1$ has not been consuming its capped power limit of 500 Watts for a period of time greater than its defined policy-defined time frame (e.g., which is 5 minutes in this case), then BMC 126 of server node 180$_1$ may implement revised power allocation characteristics 401 as shown. In this regard, BMC 126 of server node 180$_1$ may temporarily change its capped power limit to a downward-revised capped power limit that in this case is equal to a pre-defined minimum power cap level (e.g., 200 Watts in this case), and also broadcast or otherwise advertise a corresponding available 300 Watt power credit to the other server nodes 180$_1$-180$_N$ of the same defined power group of rack system 100$a$. In one embodiment, a current total amount of available power credits among the nodes of a power pool may be tracked and revised in real time, e.g., by using a Power Available counter maintained by each server node 180 in the power pool group of server rack system 100$a$.

It will be understood that the total available power credits for a power pool may be tracked and updated using any other suitable alternative methodology. It will also be understood that more than one increased power level and/or that more than one decreased power level may be defined for each information handling system node of a power pool. For example, in the example of FIGS. 3-4, an intermediate increased power level of 650 Watts and/or an intermediate decreased power level of 350 Watts may be defined such that power credits and/or debits may be exchanged when less than a full 300 Watt power credit or debit is currently available.

Still referring to the example of FIG. 4, server node 180$_2$ is shown consuming a current power level of 500 Watts, which is equal to its capped power level of 500 Watts. When BMC 126 of server node 180$_2$ detects that server node 180$_2$ is consuming its capped power limit of 500 Watts over its defined policy-defined time frame (e.g., 5 minutes in this case), then BMC 126 of server node 180$_2$ may implement revised power allocation characteristics 402 as shown. In this regard, BMC 126 of server node 180$_2$ may determine the current availability of power credits from other server nodes 180$_1$-180$_N$ of the same power pool group. Upon detecting the availability of the 300 Watts in power credits from revised power allocation characteristics 401 of server node 180$_1$, then server node 180$_2$ may claim a 300 Watt power debit from the available power credits of the power pool, and temporarily upwardly revise its capped power limit to a pre-defined maximum power cap level (e.g., 800 Watts in this case) as shown by revised power allocation characteristics 402. At this time, server node 180$_2$ may also broadcast or otherwise advertise a corresponding reduction of 300 Watts in the current total amount of available power credits for the other server nodes 180$_1$-180$_N$ of the power group of rack system 100$a$ (e.g., to cause reduction of 300 Watts in a Power Available counter maintained by each server node in the power pool group).

Figure 5:
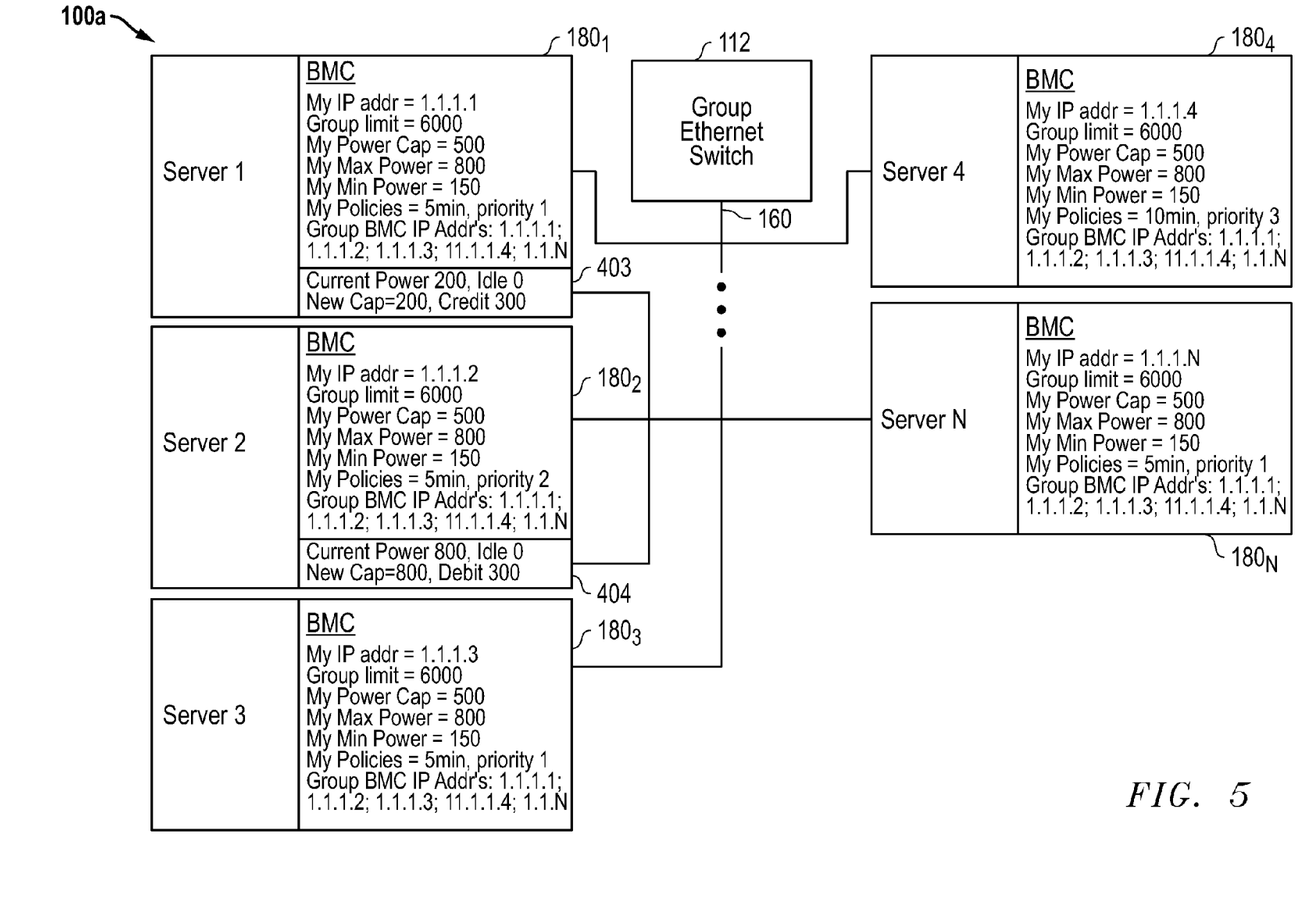
FIG. 5 illustrates a server rack system according to one exemplary embodiment of the disclosed systems and methods.

FIG. 5 illustrates an example condition under which server rack system 100$a$ of FIG. 2 may operate to dynamically re-allocate relative power consumption in real time upon further changes in power consumption requirements between the multiple information handling system nodes 180$_1$-180$_N$ of FIG. 3. In FIG. 5, server node 180$_1$ is shown no longer idle and is consuming an increased current power level of 200 Watts, which is equivalent to the temporary downward-revised capped power limit of revised power allocation characteristics 401 of FIG. 4. When BMC 126 of server node 180$_1$ detects that server node 180$_1$ is no longer idle and has been requiring an amount of power greater than its temporary power cap of 200 Watts for a period of time greater than its defined policy-defined time frame (e.g., 5 minutes), then BMC 126 of server node 180$_1$ may implement revised power allocation characteristics 403 as shown raising the current power to 200. In this example, BMC 126 of server node 180$_1$ has a current power consumption level that is sufficiently low to allow it to continue to make available a 300 Watt power credit to the power pool. In this example, revised power allocation characteristics 404 for server node 180$_2$ reflect that server node 180$_2$ continues to consume at a current power level of 800 with a temporary upwardly revised power cap of 800 Watts that was set in FIG. 4 by virtue of the available 300 Watt power debit retrieved from the power pool.

Figure 6:
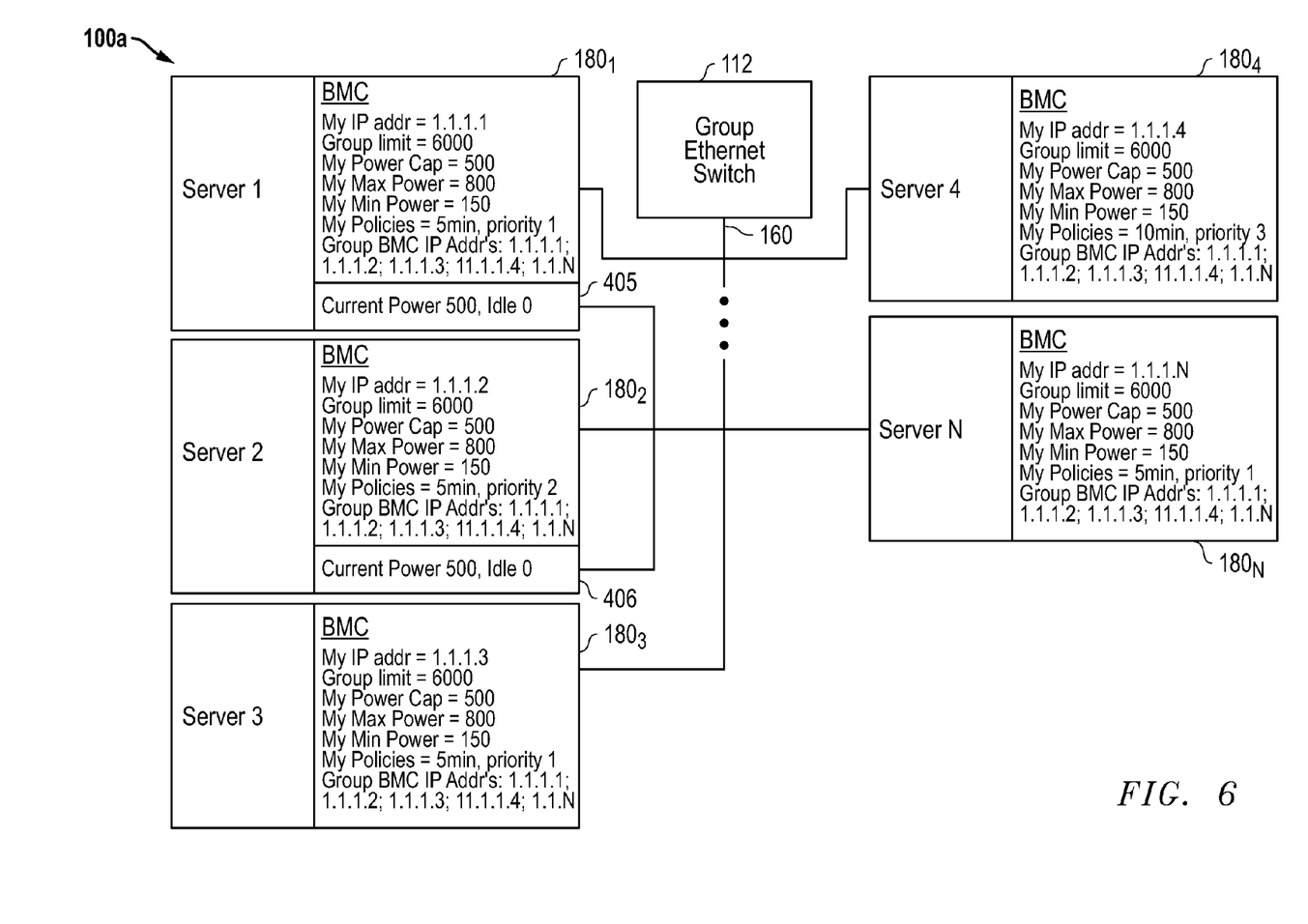
FIG. 6 illustrates a server rack system according to one exemplary embodiment of the disclosed systems and methods.

FIG. 6 illustrates an alternative situation to FIG. 5 in which insufficient power credit is no longer currently available in the power pool to allow server 180$_2$ to claim a 300 Watt power debit to raise its capped power limit to a new power cap of 800 Watts as was possible in the situation of FIGS. 4-5. Rather, in the case of FIG. 6, server node 180$_1$ is now consuming its capped power limit of 500 Watts. In such a case, BMC 126 of server node 180$_1$ may be configured to broadcast a reset command to force the BMCs 126 of all servers 180$_1$-180$_N$ in the pool to release any extra power credits they have taken. As shown in FIG. 6, when such a reset command is issued, then server nodes 180$_1$ and 180$_2$ return to their original power capped levels as originally established during initial setup. This is illustrated by revised power allocations 405 and 406, which show that both server nodes 180$_1$ and 180$_2$ have returned to their original capped power levels of 500 Watts.

FIGS. 3-6 illustrate reallocation of power between two server nodes 180$_1$ and 180$_2$ of rack server system 100$a$. However, it will be understood that more than two information handling system nodes may be each tracking total available power pool credits and simultaneously releasing power credits and/or retrieving power debits in a similar manner from a common group power pool as real time operating conditions change. In this regard, peer to peer acknowledgement for credit/debit changes may be made in one embodiment on a first come-first serve basis (subject to any assigned priority policy value) from information handling system node to information handling system node, as long as sufficient excess power capacity exists for the group. A time out mechanism may also be implemented in the event that one or more information handling system nodes go down. Such a time out mechanism may be employed as a backup mechanism to return power to the original state should a server node go offline while it has a credit/debit or has a system crash. For example, in one exemplary embodiment a time out mechanism may be a defined maximum time that a credit/debit is to be allocated, e.g., such that a server node providing a credit knows when it is safe to take back power, or such that when a server node takes a power debit it knows how long it may keep that debit.

It will also be understood that in another embodiment, a centralized power management entity that acts as a centralized power credit/debit location may be implemented by one or more processing devices (e.g., processor, microprocessor, controller, microcontroller, ASIC, FPGA, CPU, etc.). Such a centralized power management entity may track and revise a current total amount of available power credits among the individual information handling system nodes of a defined power pool and arbitrate the exchange of power credits and debits between the individual information handling system nodes in a manner similar to that described in relation to the distributed management architecture of FIGS. 3-6, but from a centralized management entity instead. A centralized power management entity may be implemented, for example, by a processing device/s separate from any processing devices of the individual information handling system nodes of a defined group of information handling system nodes (e.g., such as management subsystem 132 of server rack system 100 of FIG. 1), or may be implemented by a processing device of one of the information handling system nodes included in a defined power pool (e.g., such as a BMC 126 of a designated one of server nodes 180 of rack server system 100 of FIG. 1). For example, in one embodiment the lowest IP address member node of a pool of information handling system nodes may be selected as the gate keeper of power credits/debits, and all requests for power credits and debits may be communicated and acknowledge from one central information handling system node in the power pool group.

It will be understood that one or more steps or tasks of the techniques and methodology disclosed herein (e.g., such as described in relation to FIGS. 3-6) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as a processor, microprocessor, microcontroller, controller, etc.) to perform the one or more steps. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodology may be employed in one or more code segments of the present computer program. For example, a code segment executed by the information handling system may include one or more steps of the disclosed methodology.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system comprising:
    a group of multiple information handling system nodes pooled together in a common credit/debit power pool;
    one or more common sources of power coupled to provide power to each node of the group of information handling system nodes; and
    at least one processing device coupled to each given one of the group of multiple information handling system nodes and configured to:
        limit the power provided to the given node of the group of information handling system nodes by an assigned power cap for that given information handling system node, the total of all the assigned power caps of the group of information handling system nodes being equal to a total group power limit such that the total power provided to all of the information handling system nodes at any given time never exceeds the total group power limit, and
        monitor in real time the power consumption amount of the given node of the group of information handling system nodes and an available amount of power in the power pool; and
    where the processing devices of the group of information handling system nodes are configured to communicate among themselves to dynamically allocate and reallocate power between the individual nodes of the group of information handling system nodes in a distributed peer-to-peer manner based on the real time monitored power consumption and available amount of power in the power pool such that the total power provided to all of the information handling system nodes never exceeds the group power limit by temporarily decreasing by a given amount the assigned power cap of at least one of the information handling system nodes that has been consuming a lower real time monitored power amount than its assigned power cap, and by temporarily increasing by at least a portion of the decreased given amount the assigned power cap of at least one other one of the information handling system nodes that has been consuming a real time monitored power amount that is equal to its assigned power cap such that the total of the assigned power caps for all of the information handling system nodes never exceeds the assigned total group power limit.

2. The system of claim 1, where a first one of the processing devices is coupled to a first one of the information handling system nodes and is configured to determine an available power credit as a difference between the monitored real time power consumption of the first one of the information handling system nodes and the assigned power cap of the first information handling system node;
    where a second one of the processing devices is coupled to a second one of the information handling system nodes and is configured to determine a power need for the second one of the information handling system nodes that is consuming a real time monitored power amount that is equal to its assigned power cap;
    where the processing devices of the group of information handling system nodes are configured to communicate among themselves in a distributed peer-to-peer manner to:
        track the total of all determined real time available power credits in the power pool from all of the information handling system nodes of the group,
        transfer at least a portion of the tracked total available real time power credits in the power pool from the first one of the information handling system nodes of the group to at least a second one of the information handling system nodes and at the same time temporarily increasing the assigned power cap of the second one of the information handling system nodes for a given period of time by the transferred portion of the tracked total available real time power credits, and
    at the same time temporarily decrease the assigned power cap of the first one of the information handling system nodes for the given period of time by the transferred portion of the tracked total available real time power credits.

3. The system of claim 2, where the processing devices of the group of information handling system nodes are configured to communicate among themselves in a distributed peer-to-peer manner to:
    then return the transferred portion of the tracked total available real time power credits in the power pool from the second one of the information handling system nodes back to the first one of the information handling system nodes and at the same time decrease the assigned power cap of the second one of the information handling system nodes by the transferred portion of the tracked total available real time power credits; and
    at the same time increase the assigned power cap of the first one of the information handling system nodes by the transferred portion of the tracked total available real time power credits.

4. The system of claim 1, where the processing device of each of the information handling system nodes is communicatively coupled to each of the other processing devices of the other information handling system nodes to allow the processing devices of each of the information handling system nodes to communicate among themselves in a distributed peer-to-peer manner; and where the at least one processing device of each given information handling system node is further configured to:
- monitor in real time the power consumption amount of the given information handling system node;
- determine a difference between the monitored real time power consumption of the given information handling system node and the assigned power cap of the given information handling system node;
- communicate the determined difference between the monitored real time power consumption of the given information handling system node and the assigned power cap of the given information handling system node to the at least one processing device of each of the other information handling system nodes as an available power credit in the power pool; and
- track the total of all real time available power credits in the power pool from all of the information handling system nodes of the group.

5. The system of claim 4, where at least one processing device of at least a second one of the information handling system nodes is configured to:
- determine a power need for the second one of the information handling system nodes when the second one of the information handling system nodes is consuming a real time monitored power amount that is equal to its assigned power cap, and to claim at least a portion of the tracked total available real time power credits in the power pool from at least a first one of the information handling system nodes of the group and to temporarily increase the assigned power cap of the second one of the information handling system nodes for a given period of time by the claimed portion of the tracked total available real time power credits; and
- at the same time to temporarily decrease the assigned power cap of the first one of the information handling system nodes for the given period of time by at least part of the claimed portion of the tracked total available real time power credits.

6. The system of claim 5, where the at least one processing device of the second one of the information handling system nodes is configured to release the claimed portion of the tracked total available real time power credits to the power pool and to decrease the assigned power cap of the second one of the information handling system nodes after expiration of the same given period of time by the claimed portion of the tracked total available real time power credits; and where at least one processing device of the first one of the information handling system nodes is configured at the same time to reclaim at least a portion of the tracked total available real time power credits from the power pool and to increase the assigned power cap of the first one of the information handling system nodes after expiration of the same given period of time by at least the reclaimed portion of the tracked total available real time power credits.

7. The system of claim 6, where the information handling system group comprises a server rack system; where each of the information handling system nodes comprises a blade server; and where the at least one processing device of each information handling system nodes comprises an out-of-band processing device.

8. The system of claim 1, where each of the information handling system nodes of the group of multiple information handling system nodes itself comprises multiple information handling system nodes.

9. The system of claim 1, where the group of multiple information handling system nodes comprises at least two information handling system nodes, each given one of the information handling system nodes comprising:
- a system load having a variable power consumption capability, and
- at least one processing device, the processing device being coupled to monitor the real time power consumption of at least one component of the system load and to control the power consumption of the at least one component of the system load in real time relative to an assigned power cap for the one or more components of the system load such that the power cap is not exceeded by the power consumption of the at least one component of the system load, the total of the assigned power caps for the at least two information handling system nodes being equal to an assigned total group power limit;

where at least one processing device of a first one of the information handling system nodes is further configured to:
- determine the difference between the real time power consumption of the at least one component of the system load and the assigned power cap of the given one of the information handling system nodes, and
- make available a power credit to the power pool when the determined real time power consumption of the at least one component of the system load of the first information handling system node is less than the assigned power cap of the first information handling system node;

where at least one processing device of a second one of the information handling system nodes is further configured to request a power debit from the power pool when the determined real time power consumption of the at least one component of the system load of the second information handling system node is equal to the assigned power cap of the second information handling system node;

where at least one processing device of the first one of the information handling system nodes is further configured to then transfer the available power credit in the power pool from the at least one component of the system load of the first information handling system to the power pool by temporarily decreasing the assigned power cap of the at least one component of the system load of the first information handling system by a power value equal to the transferred power credit; and where at least one processing device of the second one of the information handling system nodes is further configured to claim the available power credit in the power poll by temporarily increasing the assigned power cap of the at least one component of the system load of the second information handling system by a power value equal to the transferred power credit from the power pool such that the total of the assigned power caps for the information handling system nodes never exceeds the assigned total group power limit.

10. The system of claim 1, where the processing device of each of the group of information handling system nodes is configured to update a total available amount of power credits in the credit/debit power pool by broadcasting its power credits and its power debits to the processing devices of each of the other information handling system nodes in the group of information handling system nodes.

11. The system of claim 1, where the processing devices of the group of information handling system nodes are configured to communicate among themselves to dynamically allocate and reallocate power between the individual nodes of the group of information handling system nodes in a distributed peer-to-peer manner based on the real time monitored power consumption and available amount of power in the power pool such that the total power provided to all of the information handling system nodes never exceeds the group power limit by temporarily decreasing by a given amount the assigned power cap of at least one of the information handling system nodes that has been consuming a lower real time monitored power amount than its assigned power cap for a maximum specified decremented power consumption time; and by temporarily increasing by at least a portion of the decreased given amount the assigned power cap of at least one other one of the information handling system nodes that has been consuming a real time monitored power amount that is equal to its assigned power cap by a maximum specified incremented power consumption time.

12. The system of claim 1, where the processing devices of the group of information handling system nodes are configured to communicate among themselves to dynamically allocate and reallocate power between the individual nodes of the group of information handling system nodes in a distributed peer-to-peer manner using a peer-to-peer acknowledgement for power credit/debit changes on a first come-first serve bases from information handling system node to information handling system node.

13. A method of dynamically allocating relative power consumption between a group of multiple information handling system nodes, comprising:
providing power to each node of the group of information handling system nodes pooled together in a common credit/debit power pool, each of the given information handling system including at least one processing device;
using the at least one processing device of each given one of the information handling system nodes to:
limit the power provided to the given information handling system node by an assigned power cap for that given information handling system node, the total of all the assigned power caps of the group of information handling system nodes being equal to a total group power limit such that the total power provided to all of the information handling system nodes at any given time never exceeds the total group power limit, and
monitor in real time the power consumption amount of the given one of the information handling system nodes; and
allocating power between the individual nodes of the group of information handling system nodes in a distributed peer-to-peer manner based on the real time monitored power consumption and available amount of power in the power pool such that the total power provided to all of the information handling system nodes never exceeds the group power limit by:
using the at least one processing device of each given one of the information handling system nodes to temporarily decrease by a given amount the assigned power cap of the given information handling system node when it has been consuming a lower real time monitored power amount than its assigned power cap, and
using the at least one processing device of each given one of the information handling system nodes to temporarily increase by at least a portion of the decreased given amount that the assigned power cap of at least one other one of the information handling system nodes that has been consuming a real time monitored power amount that is equal to its assigned power cap such that the total of the assigned power caps for all of the information handling system nodes never exceeds the assigned total group power limit.

14. The method of claim 13, further comprising:
using at least one processing device of at least a first one of the information handling system nodes to determine an available power credit as a difference between the monitored real time power consumption of the first one of the information handling system nodes and the assigned power cap of the first information handling system node;
using at least one processing device of at least a second one of the information handling system nodes to determine a power need for the second one of the information handling system nodes that is consuming a real time monitored power amount that is equal to its assigned power cap;
using the processing devices of the group of information handling system nodes to communicate among themselves in a distributed peer-to-peer manner to:
track the total of all determined real time available power credits from all of the information handling system nodes of the group,
transfer at least a portion of the tracked total available real time power credits in the power pool from the first one of the information handling system nodes of the group to at least a second one of the information handling system nodes and at the same time temporarily increasing the assigned power cap of the second one of the information handling system nodes for a given period of time by the transferred portion of the tracked total available real time power credits, and
at the same time temporarily decreasing the assigned power cap of the first one of the information handling system nodes for the given period of time by the transferred portion of the tracked total available real time power credits.

15. The method of claim 14, further comprising using the processing devices of the group of information handling system nodes to communicate among themselves in a distributed peer-to-peer manner to:
then return the transferred portion of the tracked total available real time power credits in the power pool from the second one of the information handling system nodes back to the first one of the information handling system nodes and at the same time decreasing the assigned power cap of the second one of the information handling system nodes by the transferred portion of the tracked total available real time power credits; and
at the same time increase the assigned power cap of the first one of the information handling system nodes by the transferred portion of the tracked total available real time power credits.

16. The method of claim 13, where the processing device of each of the information handling system nodes is communicatively coupled to each of the other processing devices of the other information handling system nodes to allow the processing devices of each of the information handling system nodes to communicate among themselves in a distributed peer-to-peer manner; and further comprising using the at least one processing device of each given information handling system node to:

monitor in real time the power consumption amount of the given information handling system node;

determine a difference between the monitored real time power consumption of the given information handling system node and the assigned power cap of the given information handling system node;

communicate the determined difference between the monitored real time power consumption of the given information handling system node and the assigned power cap of the given information handling system node to the at least one processing device of each of the other information handling system nodes as an available power credit in the power pool; and     track the total of all real time available power credits in the power pool from all of the information handling system nodes of the group.

17. The method of claim 16, further comprising:

using the at least one processing device of at least a second one of the information handling system nodes to determine a power need for the second one of the information handling system nodes that is consuming a real time monitored power amount that is equal to its assigned power cap;

using the at least one processing device of the second one of the information handling system nodes to claim at least a portion of the tracked total available real time power credits in the power pool from at least a first one of the information handling system nodes of the group and to temporarily increase the assigned power cap of the second one of the information handling system nodes for a given period of time by the claimed portion of the tracked total available real time power credits; and     at the same time using the at least one processing device of the first one of the information handling system nodes to temporarily decrease the assigned power cap of the first one of the information handling system nodes for the given period of time by at least part of the claimed portion of the tracked total available real time power credits.

18. The method of claim 17, further comprising:

using the at least one processing device of the second one of the information handling system nodes to release the claimed portion of the tracked total available real time power credits to the power pool and to decrease the assigned power cap of the second one of the information handling system nodes after expiration of the same given period of time by the claimed portion of the tracked total available real time power credits; and     at the same time using the at least one processing device of the first one of the information handling system nodes to reclaim at least a portion of the tracked total available real time power credits from the power pool and to increase the assigned power cap of the first one of the information handling system nodes after expiration of the same given period of time by at least the reclaimed portion of the tracked total available real time power credits.

19. The method of claim 18, where the information handling system group comprises a server rack system; where each of the information handling system nodes comprises a blade server; and where the at least one processing device of each information handling system nodes comprises an out-of-band processing device.

20. The method of claim 13, where each of the information handling system nodes of the group of multiple information handling system nodes itself comprises multiple information handling system nodes.

21. The method of claim 13, further comprising using the processing device of each of the group of information handling system nodes to update a total available amount of power credits in the credit/debit power pool by broadcasting its power credits and its power debits to the processing devices of each of the other information handling system nodes in the group of information handling system nodes.

22. The method of claim 13, further comprising using the processing devices of the group of information handling system nodes to communicate among themselves to dynamically allocate and reallocate power between the individual nodes of the group of information handling system nodes in a distributed peer-to-peer manner based on the real time monitored power consumption and available amount of power in the power pool such that the total power provided to all of the information handling system nodes never exceeds the group power limit by temporarily decreasing by a given amount the assigned power cap of at least one of the information handling system nodes that has been consuming a lower real time monitored power amount than its assigned power cap for a maximum specified decremented power consumption time; and by temporarily increasing by at least a portion of the decreased given amount the assigned power cap of at least one other one of the information handling system nodes that has been consuming a real time monitored power amount that is equal to its assigned power cap by a maximum specified incremented power consumption time.

23. The method of claim 13, further comprising using the processing devices of the group of information handling system nodes to communicate among themselves to dynamically allocate and reallocate power between the individual nodes of the group of information handling system nodes in a distributed peer-to-peer manner using a peer-to-peer acknowledgement for power credit/debit changes on a first come-first serve bases from information handling system node to information handling system node.

\* \* \* \* \*